(12) United States Patent
Leabman et al.

(10) Patent No.: US 9,143,000 B2
(45) Date of Patent: *Sep. 22, 2015

(54) PORTABLE WIRELESS CHARGING PAD

(71) Applicant: ENERGOUS CORPORATION, San Jose, CA (US)

(72) Inventors: Michael A. Leabman, San Ramon, CA (US); Gregory Scott Brewer, Livermore, CA (US)

(73) Assignee: Energous Corporation, San Jose, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/939,706

(22) Filed: Jul. 11, 2013

(65) Prior Publication Data

US 2015/0015195 A1 Jan. 15, 2015

(51) Int. Cl.
*H02J 7/00* (2006.01)
*H02J 7/02* (2006.01)

(52) U.S. Cl.
CPC .............. *H02J 7/025* (2013.01); *H02J 7/0042* (2013.01)

(58) Field of Classification Search
CPC ......... H02J 70/025; H04B 5/037; H01F 38/14
USPC ........................................ 320/104, 107, 108
See application file for complete search history.

(56) References Cited

U.S. PATENT DOCUMENTS

| 6,127,942 | A | 10/2000 | Welle |
| 6,798,716 | B1 | 9/2004 | Charych |
| 7,027,311 | B2 | 4/2006 | Vanderelli et al. |
| 7,639,994 | B2 | 12/2009 | Greene et al. |
| 7,643,312 | B2 | 1/2010 | Vanderelli et al. |
| 7,812,771 | B2 | 10/2010 | Greene et al. |
| 7,844,306 | B2 | 11/2010 | Shearer et al. |
| 7,868,482 | B2 | 1/2011 | Greene et al. |
| 7,898,105 | B2 | 3/2011 | Greene et al. |
| 7,925,308 | B2 | 4/2011 | Greene et al. |
| 8,115,448 | B2 | 2/2012 | John |
| 8,159,090 | B2 | 4/2012 | Greene et al. |

(Continued)

FOREIGN PATENT DOCUMENTS

EP 2545635 A2 1/2013
WO WO2010022181 A1 2/2010

OTHER PUBLICATIONS

International Search Report dated Oct. 28, 2014 corresponding to International Patent Application No. PCT/US2014/045102, 4 pages.

(Continued)

*Primary Examiner* — Vuthe Siek
(74) *Attorney, Agent, or Firm* — Eric L. Sophir; Dentons US LLP

(57) ABSTRACT

The present disclosure provides a method and apparatus for improved wireless charging pads for charging and/or powering electronic devices. Such pads may not require a power chord for connecting to a main power supply, for example a wall outlet. In contrast, power may be delivered wireless to the foregoing pads through pocket-forming. A transmitter connected to a power source may deliver pockets of energy to the pads which through at least one embedded receiver may convert such pockets of energy to power. Lastly, the pads may power and/or charge electronic devices through suitable wireless power transmission techniques such as magnetic induction, electrodynamics induction or pocket-forming.

20 Claims, 7 Drawing Sheets

(56) References Cited

U.S. PATENT DOCUMENTS

| | | | |
|---|---|---|---|
| 8,159,364 B2 | 4/2012 | Zeine | |
| 8,180,286 B2 | 5/2012 | Yamasuge | |
| 8,380,255 B2 | 2/2013 | Shearer et al. | |
| 8,410,953 B2 | 4/2013 | Zeine | |
| 8,432,062 B2 | 4/2013 | Greene et al. | |
| 8,446,248 B2 | 5/2013 | Zeine | |
| 8,461,817 B2 | 6/2013 | Martin et al. | |
| 8,558,661 B2 | 10/2013 | Zeine | |
| 8,621,245 B2 | 12/2013 | Shearer et al. | |
| 8,854,176 B2 | 10/2014 | Zeine | |
| 9,000,616 B2 | 4/2015 | Greene et al. | |
| 9,021,277 B2 | 4/2015 | Shearer et al. | |
| 2006/0238365 A1 | 10/2006 | Vecchione et al. | |
| 2007/0178945 A1 | 8/2007 | Cook et al. | |
| 2007/0191075 A1 | 8/2007 | Greene et al. | |
| 2010/0027379 A1 | 2/2010 | Saulnier et al. | |
| 2010/0194206 A1* | 8/2010 | Burdo et al. | 307/104 |
| 2010/0225270 A1 | 9/2010 | Jacobs et al. | |
| 2010/0315045 A1 | 12/2010 | Zeine | |
| 2010/0328044 A1 | 12/2010 | Waffenschmidt et al. | |
| 2010/0332401 A1* | 12/2010 | Prahlad et al. | 705/80 |
| 2011/0074342 A1 | 3/2011 | MacLaughlin | |
| 2011/0282415 A1 | 11/2011 | Eckhoff et al. | |
| 2012/0157019 A1 | 6/2012 | Li | |
| 2012/0193999 A1 | 8/2012 | Zeine | |
| 2012/0299540 A1 | 11/2012 | Perry | |
| 2012/0299541 A1 | 11/2012 | Perry | |
| 2012/0299542 A1 | 11/2012 | Perry | |
| 2012/0300588 A1 | 11/2012 | Perry | |
| 2012/0300592 A1 | 11/2012 | Perry | |
| 2012/0300593 A1 | 11/2012 | Perry | |
| 2013/0106197 A1 | 5/2013 | Bae et al. | |
| 2013/0207604 A1 | 8/2013 | Zeine | |
| 2013/0241468 A1 | 9/2013 | Moshfeghi | |
| 2013/0241474 A1 | 9/2013 | Moshfeghi | |
| 2013/0264997 A1* | 10/2013 | Lee et al. | 320/106 |
| 2014/0035524 A1 | 2/2014 | Zeine | |
| 2014/0217967 A1 | 8/2014 | Zeine et al. | |
| 2014/0241231 A1 | 8/2014 | Zeine | |
| 2014/0265725 A1 | 9/2014 | Angle et al. | |
| 2014/0265727 A1 | 9/2014 | Berte | |
| 2014/0265943 A1 | 9/2014 | Angle et al. | |
| 2014/0281655 A1 | 9/2014 | Angle et al. | |
| 2014/0325218 A1* | 10/2014 | Shimizu et al. | 713/168 |
| 2015/0015180 A1* | 1/2015 | Miller et al. | 320/103 |

OTHER PUBLICATIONS

Written Opinion of the International Searching Authority dated Oct. 28, 2014 corresponding to International Patent Application No. PCT/US2014/045102, 10 pages.

* cited by examiner

PORTABLE WIRELESS CHARGING PAD

CROSS-REFERENCES TO RELATED APPLICATIONS

The present disclosure is related to U.S. Non-Provisional patent application Ser. No. 13/891,430 filed May 20, 2013, entitled "Methodology For Pocket-forming" and Ser. No. 13/925,469 filed Jun. 24, 2013, entitled "Methodology for Multiple Pocket-Forming" the entire contents of which are incorporated herein by these references.

FIELD OF INVENTION

The present disclosure relates to charging pads, and more particularly to portable wireless charging pads.

BACKGROUND OF THE INVENTION

Electronic devices such as laptop computers, smartphones, portable gaming devices, tablets and so forth may require power for performing their intended functions. This may require having to charge electronic equipment at least once a day, or in high-demand electronic devices more than once a day. Such an activity may be tedious and may represent a burden to users. For example, a user may be required to carry chargers in case his electronic equipment is lacking power. In addition, users have to find available power sources to connect to. Lastly, users must plugin to a wall or other power supply to be able to charge his or her electronic device. However, such an activity may render electronic devices inoperable during charging. Current solutions to this problem may include inductive charging pads which may employ magnetic induction or resonating coils. Nevertheless, such a solution may still require that electronic devices may have to be placed in a specific place for powering. Thus, electronic devices during charging may not be portable. For the foregoing reasons, there is a need for charging pads with improved mobility and portability.

SUMMARY OF THE INVENTION

The present disclosure provides a method and apparatus for improved wireless charging pads for powering and/or charging electronic devices such as smartphones, tablets and the like.

A portable wireless charging pad, comprises a pad receiver embedded within the charging pad and connected to antenna elements on a surface of the pad for receiving pockets of energy from a pocket-forming power transmitter to charge a pad battery; and a pad pocket-forming transmitter powered by the pad battery including a RF chip connected to antenna elements for generating pockets of energy to charge or power a portable electronic device having a receiver to capture the pockets of energy from the pad transmitter in proximity to the charging pad.

In an embodiment, a description of pocket-forming methodology using at least one transmitter and at least one receiver may be provided.

In another embodiment, a transmitter suitable for pocket-forming including at least two antenna elements may be provided.

In a further embodiment, a receiver suitable for pocket forming including at least one antenna element may be provided.

In an embodiment, a cordless pad for powering electronic devices including at least one embedded receiver with antennas placed alongside the edge of the pad may be provided.

In an even further embodiment, a cordless pad for powering electronic devices including at least one embedded receiver with antennas placed on the top surface of the pad may be provided. As an alternative, cordless pads may employ various methods for powering electronic devices such as magnetic induction, electrodynamics induction or pocket-forming.

In yet another embodiment, a cordless pad with a charging module may be provided.

In an embodiment, a pad embedded within suitable apparel such as backpacks, briefcases and the like may be provided.

The disclosed embodiments provide wireless charging pads that may not require a power cord for connecting to a power supply. Thus, mobility and portability may greatly be enhanced in such pads. In addition, pads utilizing pocket-forming for connecting wirelessly to a power supply and for delivering power to electronic devices may increase the mobility of electronic devices while charging.

BRIEF DESCRIPTION OF THE DRAWINGS

Embodiments of the present disclosure are described by way of example with reference to the accompanying figures, which are schematic and may to be drawn to scale. Unless indicated as representing prior art, the figures represent aspects of the present disclosure.

DETAILED DESCRIPTION OF THE DRAWINGS

Definitions

Figure 1:
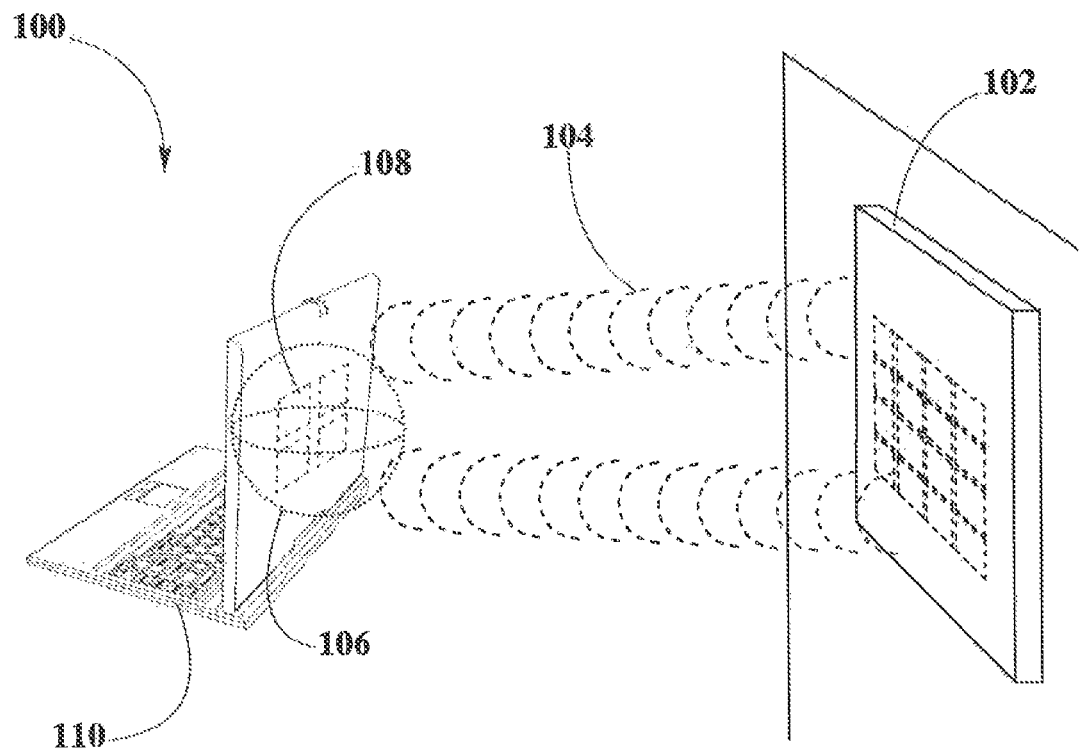
FIG. 1 illustrates wireless power transmission using pocket-forming, according to the present invention.

"Pocket-forming" may refer to generating two or more RF waves which converge in 3-d space, forming controlled constructive and destructive interference patterns.

"Pockets of energy" may refer to areas or regions of space where energy or power may accumulate in the form of constructive interference patterns of RF waves.

"Null-space" may refer to areas or regions of space where pockets of energy do not form because of destructive interference patterns of RF waves.

"Transmitter" may refer to a device, including a chip which may generate two or more RE signals, at least one RF signal being phase shifted and gain adjusted with respect to other RF signals, substantially all of which pass through one or more RF antenna such that focused RF signals are directed to a target.

"Receiver" may refer to a device which may include at least one antenna, at least one rectifying circuit and at least one power converter for powering or charging an electronic device using RF waves.

"Adaptive pocket-forming" may refer to dynamically adjusting pocket-forming to regulate power on one or more targeted receivers

DESCRIPTION OF THE DRAWINGS

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

A. Essentials of Pocket-Forming

FIG. 1 illustrates wireless power transmission 100 using pocket-forming. A transmitter 102 may transmit controlled Radio Frequency (RF) waves 104 which may converge in 3-d space. These RF waves may be controlled through phase and/or relative amplitude adjustments to form constructive and destructive interference patterns (pocket-forming). Pockets of energy 106 may form at constructive interference patterns and can be 3-dimensional in shape whereas null-spaces may be generated at destructive interference patterns. A receiver 108 may then utilize pockets of energy 106 produced by pocket-forming for charging or powering an electronic device, for example a laptop computer 110 and thus effectively providing wireless power transmission. In some embodiments, there can be multiple transmitters 102 and/or multiple receivers 108 for powering various electronic devices, for example smartphones, tablets, music players, toys and others at the same time. In other embodiments, adaptive pocket-forming may be used to regulate power on electronic devices.

Figure 2:
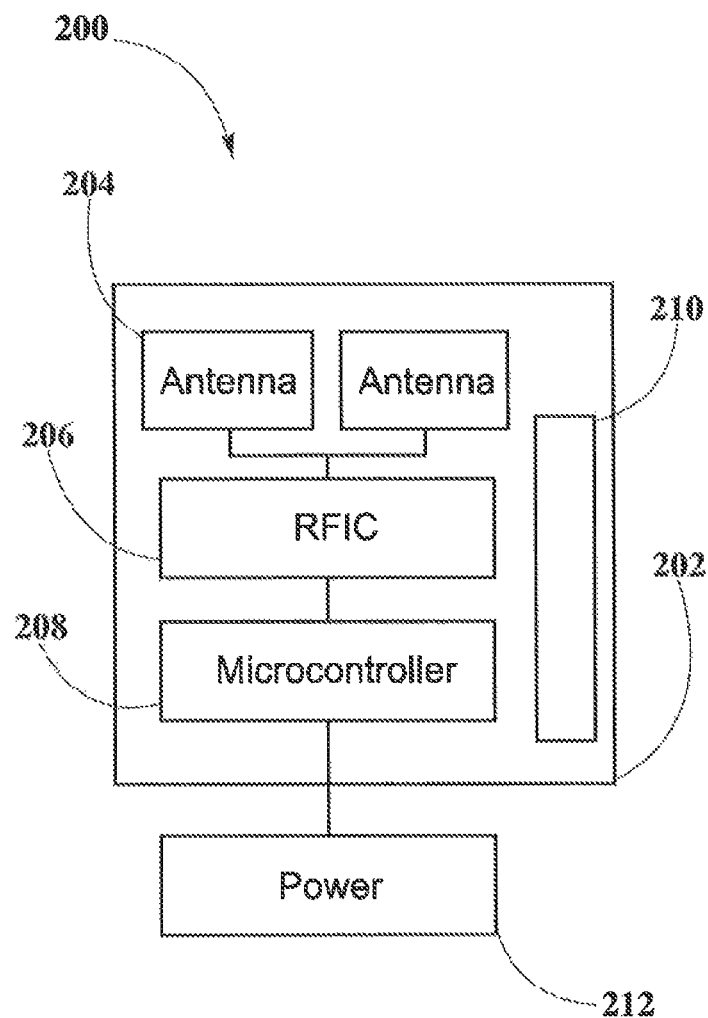
FIG. 2 illustrates a component level illustration for a transmitter which may be utilized to provide wireless power transmission as described in FIG. 1, according to the present invention.

FIG. 2 illustrates a component level embodiment for a transmitter 200 which may be utilized to provide wireless power transmission 100 as described in FIG. 1. Transmitter 200 may include a housing 202 where at least two or more antenna elements 204, at least one RF integrated circuit (RFIC) 206, at least one digital signal processor (DSP) or micro-controller 208, and one optional communications component 210 may be included. Housing 202 can be made of any suitable material which may allow for signal or wave transmission and/or reception, for example plastic or hard rubber. Antenna elements 204 may include suitable antenna types for operating in frequency bands such as 900 MHz, 2.5 GHz or 5.8 GHz as these frequency bands conform to Federal Communications Commission (FCC) regulations part 18 (Industrial, Scientific and Medical equipment). Antenna elements 204 may include vertical or horizontal polarization, right hand or left hand polarization, elliptical polarization, or other suitable polarizations as well as suitable polarization combinations. Suitable antenna types may include, for example, patch antennas with heights from about 1/24 inches to about 1 inch and widths from about 1/24 inches to about 1 inch. Other antenna elements 204 types can be used, for example meta-materials, dipole antennas among others. RFIC 206 may include a proprietary chip for adjusting phases and/or relative magnitudes of RF signals which may serve as inputs for antenna elements 204 for controlling pocket-forming. These RF signals may be produced using an external power supply 212 and a local oscillator chip (not shown) using a suitable piezoelectric material. Micro-controller 208 may then process information send by a receiver through its own antenna elements for determining optimum times and locations for pocket-forming. In some embodiments, the foregoing may be achieved through communications component 210. Communications component 210 may be based on standard wireless communication protocols which may include Bluetooth, WiFi or ZigBee. In addition, communications component 210 may be used to transfer other information such as an identifier for the device or user, battery level, location or other such information. Other communications component 210 may be possible which may include radar, infrared cameras or sound devices for sonic triangulation for determining the device's position.

Figure 3:
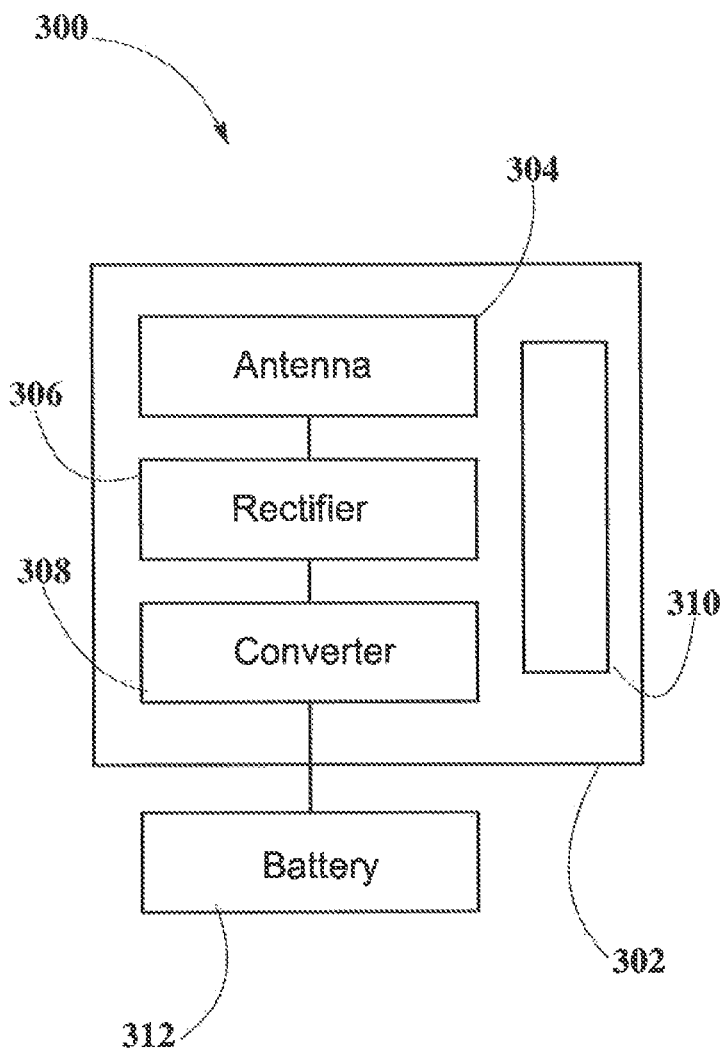
FIG. 3 illustrates a component level embodiment for a receiver which can be used for powering or charging an electronic device as described in FIG. 1, according to the present invention.

FIG. 3 illustrates a component level embodiment for a receiver 300 which can be used for powering or charging an electronic device as exemplified in wireless power transmission 100. Receiver 300 may include a housing 302 where at least one antenna element 304, one rectifier 306, one power converter 308 and an optional communications component 310 may be included. Housing 302 can be made of any suitable material which may allow for signal or wave transmission and/or reception, for example plastic or hard rubber. Housing 302 may be an external hardware that may be added to different electronic equipment, for example in the form of cases, or can be embedded within electronic equipment as well. Antenna element 304 may include suitable antenna types for operating in frequency bands similar to the bands described for transmitter 200 from FIG. 2. Antenna element 304 may include vertical or horizontal polarization, right hand or left hand polarization, elliptical polarization, or other suitable polarizations as well as suitable polarization combinations. Using multiple polarizations can be beneficial in devices where there may not be a preferred orientation during usage or whose orientation may vary continuously through time, for example a smartphone or portable gaming system. On the contrary, for devices with well-defined orientations, for example a two-handed video game controller, there might be a preferred polarization for antennas which may dictate a ratio for the number of antennas of a given polarization. Suitable antenna types may include patch antennas with heights from about 1/24 inches to about 1 inch and widths from about 1/24 inches to about 1 inch. Patch antennas may have the advantage that polarization may depend on connectivity, i.e. depending on which side the patch is fed, the polarization may change. This may further prove advantageous as a receiver, such as receiver 300, may dynamically modify its antenna polarization to optimize wireless power transmission. Rectifier 306 may include diodes or resistors, inductors or capacitors to rectify the alternating current (AC) voltage generated by antenna element 304 to direct current (DC) voltage. Rectifier 306 may be placed as close as is technically possible to antenna element 304 to minimize losses. After rectifying AC voltage, DC voltage may be regulated using power converter 308. Power converter 308 can be a DC-DC converter which may help provide a constant voltage output, regardless of input, to an electronic device, or as in this embodiment to a battery 312. Typical voltage outputs can be from about 5 volts to about 1.0 volts. Lastly, communications component 310, similar to that of transmitter 209 from FIG. 2, may be included in receiver 300 to communicate with a transmitter or to other electronic equipment.

B. Improved Wireless Charging Pad

Figure 4:
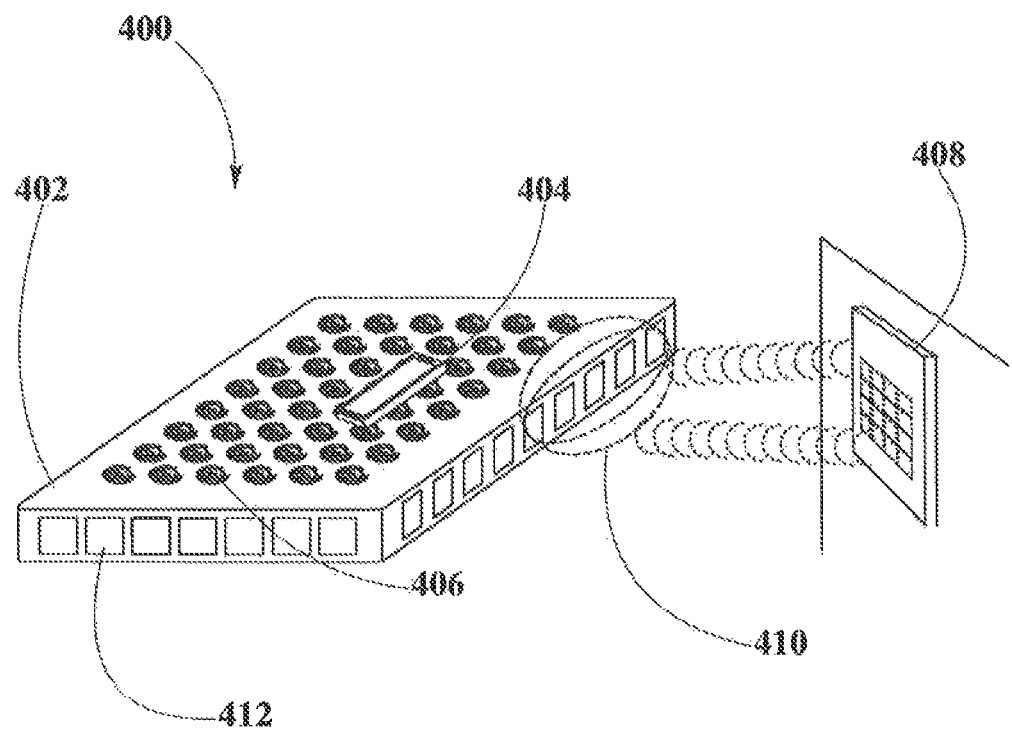
FIG. 4 illustrates a wireless power transmission where a pad, with improved portability, may provide wireless power to an electronic, according to the present invention.

FIG. 4 illustrates a wireless power transmission 400 where a pad 402, with improved portability, may provide wireless power to a smartphone 404. In the prior art, pad 402 may include a power chord which may connect to a wall outlet running on alternating current (AC) power. Such AC power may then be transmitted wirelessly to smartphone 404, through magnetic induction or electrodynamics induction, via a plurality of inductive elements 406. Inductive elements 406 may include, for example, coils or inductors. As is known in the prior art, smartphone 404 may also incorporate external hardware, such as cases, which may include a plurality of inductive elements 406 (not shown) for receiving the power sent by pad 402. The foregoing configuration may not really be wireless because a power chord may still be required. In addition, the location of pad 402, and therefore of smartphone 404 may negatively be affected by the location of an available power outlet, i.e. if the wall outlet is in hard-to-reach locations such as behind a sofa or TV screen, so will be pad 402 and smartphone 404. The foregoing situation can easily be solved by eliminating the power chord used in the prior art. In an embodiment, wireless power transmission 400 may be carried out using a transmitter 408 and embedding at least one receiver (not shown) within pad 402. Transmitter 408 may provide pockets of energy 410 to embedded receivers which may provide power to inductive elements 406 from pad 402 for powering smartphone 404 wirelessly. Antenna elements 412 (as described in FIG. 2 and FIG. 3), from the foregoing embedded receivers, may be placed outside the edges of pad 402 for improved power reception independent of the location of transmitter 408. The foregoing configuration may be beneficial because pad 402 may no longer be constrained by the location of a suitable wall outlet. In addition, pad 402 can be put in easy-to-reach locations such as tables, counters and the like that are inside the range of transmitter 408. In some embodiments the range of transmitter 408 can be up to about 15 feet. The foregoing can be achieved by placing about 256 antennas in transmitter 408, and an embedded receiver with about 80 antennas. The power transmitted can be up to one watt.

Figure 5:
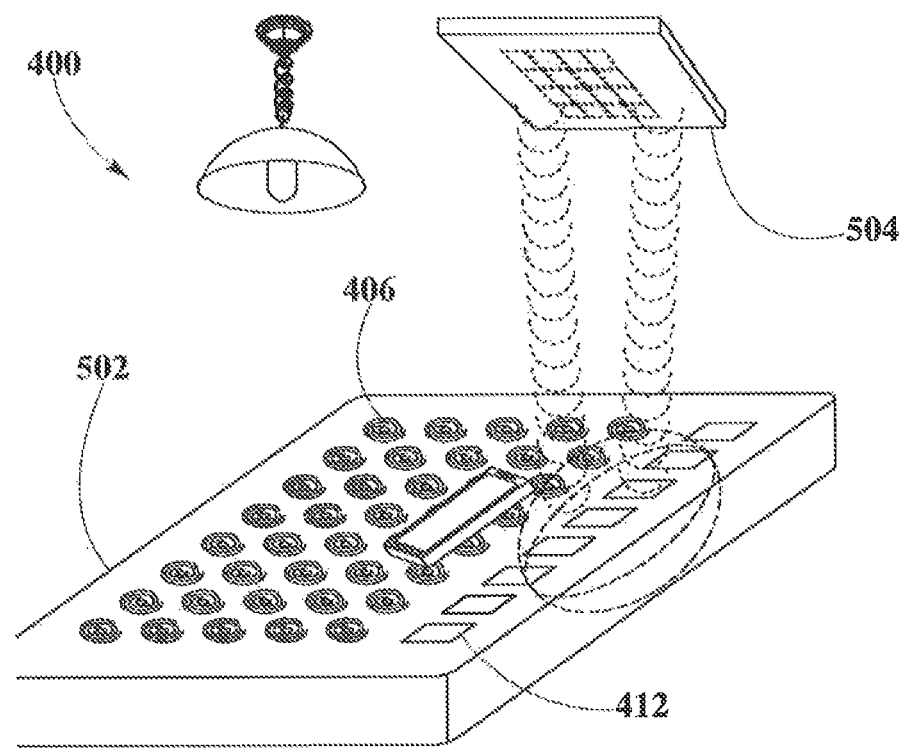
FIG. 5 illustrates a wireless power transmission where an alternate pad, with improved portability, may provide wireless power to an electronic device, according to the present invention.

FIG. 5 illustrates another embodiment of wireless power transmission 400 where a pad 502 (similar to pad 402 from FIG. 4 above) may include a plurality of inductive elements 406 and at least one embedded receiver (not shown). Embedded receivers may include antenna elements 412 located on the top surface of pad 502. This configuration may be beneficial when using a transmitter 504 located above pad 502, for example in ceilings. In other embodiments, the foregoing pads, as described through FIG. 4 and FIG. 5, may not use inductive elements 406, but in contrast may utilize pocket-forming for transmitting power wirelessly. For example, transmitter 408 may provide power to either pad 402 or pad 502 through pocket-forming. Then, a second transmitter within either pad 402 or pad 502 may re-transmit the power sent by transmitter 408 to electronic devices nearby the aforementioned pads. Lastly, electronic devices requiring power may incorporate external hardware, for example cases, similar to those utilized in the prior art for magnetic induction or electrodynamics induction. Such external hardware may incorporate receivers suited for pocket-forming instead of inductive elements 406. The aforementioned configuration may further expand the range wireless power transmission 400 because electronic devices such as smartphone 404 may not even be required to be placed on the pads, but only near the pads (up to 15 feet away for example). Thus, pad 402 or pad 502 may need only to be from about 2 inches×4 inches in surface area.

Figure 6:
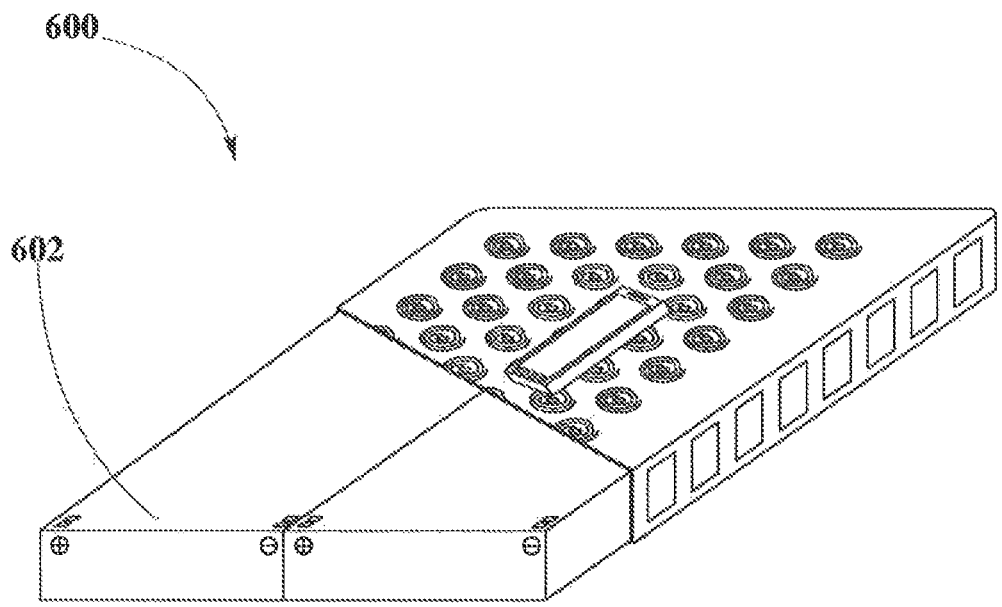
FIG. 6 illustrates a portable pad which may include a module for storing charge, according to the present invention.

FIG. 6 illustrates a pad 600 which in this embodiment may include a plurality of inductive elements 406, at least one embedded receiver (not shown) for powering smartphone 404. As described above, through FIG. 4 and FIG. 5, pad 600 may receive power wireless through pocket-forming and may not require a power chord for connecting to a power supply such as a wall outlet. In some embodiments, pad 600 may also include at least one module 602 for storing charge, for example a lithium ion battery. Module 602 may store charge while charging or not smartphone 404. In some embodiments, pad 600 may utilize magnetic induction, electrodynamics induction of pocket-forming for powering smartphone 404 as described through FIG. 4 and FIG. 5. Once pad 600 is charged, it may be placed at any location, or even carried around for powering electronic devices as described in FIG. 7 below.

Figure 7:
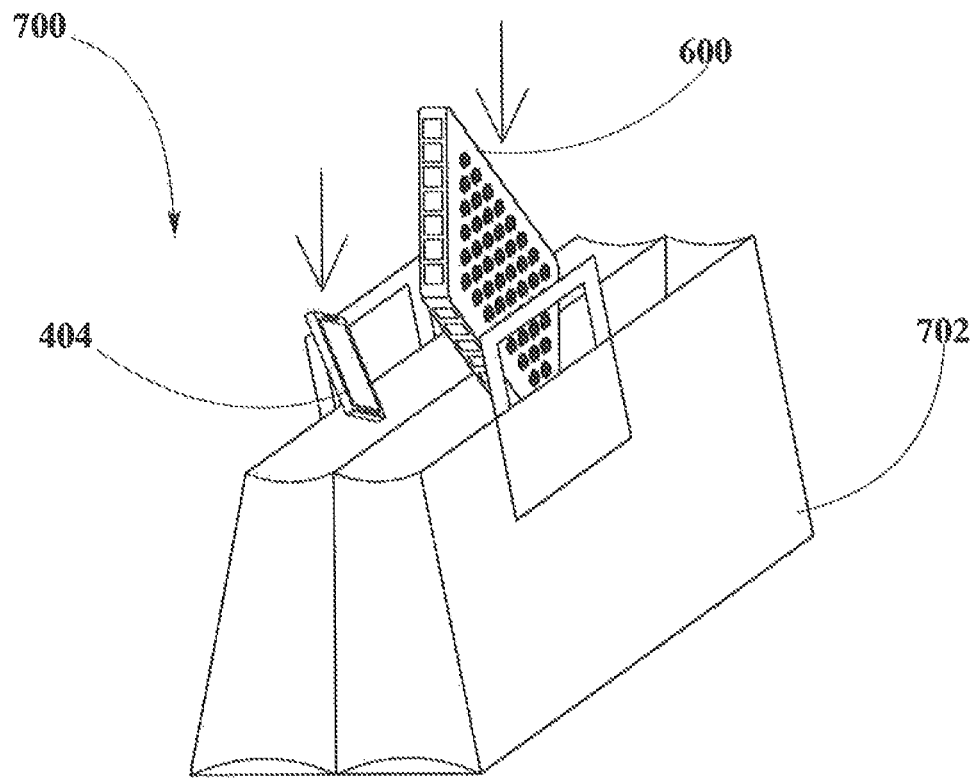
FIG. 7 illustrates an example situation where pad from FIG. 6 can be used, according to the present invention.

FIG. 7 illustrates an example situation 700 where pad 600 may be carried around in a briefcase 702 for powering smartphone 404. Pad 600 can be carried in backpacks, women purses and the like. In some embodiments, pad 600 may be embedded within the foregoing items and sold as one charging unit. Furthermore, such a charging unit can be powered wirelessly through pocket-forming or may incorporate a power chord for plugging into a wall outlet. Devices inside a bag, purse or the like are by default not in use, and can therefore sacrifice mobility while powering using the former option.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

Having thus described the invention, we claim:

1. A method for a portable wireless charging pad, comprising:
   embedding at least one receiver within the pad;
   receiving pockets of energy from a pocket-forming transmitter at the receiver; and
   charging wirelessly a portable electronic device in proximity to the pad;
   wherein the portable electronic device includes a receiver connected to a battery within the electronic device for receiving the wireless charge from the pad, and wherein charging wirelessly includes a pocket-forming transmitter embedded in the pad for generating pockets of energy delivered to the receiver in the electronic device.

2. The method for a portable wireless charging pad of claim 1, wherein the charging wirelessly includes inductive elements connected to the receiver in the pad for powering the electronic device in proximity to the pad.

3. The method for a portable wireless charging pad of claim 1, wherein the embedded pad transmitter includes integrated RF circuitry connected to an antenna array configured around a perimeter or on a surface of the pad.

4. A method for a portable wireless charging pad, comprising:
   embedding at least one receiver within the pad;
   receiving pockets of energy from a pocket-forming transmitter at the receiver; and
   charging wirelessly a portable electronic device in proximity to the pad;
   wherein the pad receiver and the transmitter each include a circuitry for a radio frequency integrated circuit, an antenna array, a microcontroller and a communication component circuit for communications between the pad receiver and the transmitter to control the powering and charging of the portable electronic device.

5. A method for a portable wireless charging pad, comprising:
   embedding at least one receiver within the pad;
   receiving pockets of energy from a pocket-forming transmitter at the receiver;
   charging wirelessly a portable electronic device in proximity to the pad;
   communicating between the electronic device receiver and the pad transmitter through short RF waves or pilot signals on conventional wireless communication protocols including Bluetooth, Wi-Fi, Zigbee or FM radio signal with the battery level information for the electronic device to be charged;
   scanning for Bluetooth electronic devices available for wireless pad charging; and
   prioritizing the charging or powering of the available electronic devices whereby the pad transmitter directs pocket-forming towards predetermined electronic devices in a predetermined priority order.

6. A method for a portable wireless charging pad, comprising:
   embedding at least one receiver within the pad;
   receiving pockets of energy from a pocket-forming transmitter at the receiver;
   charging wirelessly a portable electronic device in proximity to the pad; and
   transmitting simultaneously both Wi-Fi signals and pocket-forming RF waves from the pad transmitter to the portable electronic device receiver in proximity to the pad;
   wherein the pad receiver and the transmitter each include a circuitry for a radio frequency integrated circuit, an antenna array, a microcontroller and a communication component circuit for communications between the pad receiver and the transmitter to control the powering and charging of the portable electronic device.

7. A method for a portable wireless charging pad, comprising:
   supplying pockets of energy to a pad receiver including circuitry of an antenna element, a digital signal processor (DSP), a rectifier, a power converter and a communications device connected to a pad battery;
   pocket-forming in a pad transmitter including circuitry of antenna elements, a RF integrated chip controlled by a DSP for pocket-forming to develop pockets of energy for charging and powering a battery in an electronic device in proximity to the pad and a communication device controlled by the DSP;
   pocket-forming in a power transmitter supplying pockets of energy to the pad receiver;
   communicating a power level of the pad battery from the pad receiver to the power transmitter through short RF signals between the pad receiver and power transmitter communication devices, respectively, over conventional wireless communication protocols;
   decoding short RF signals from a portable electronic device receiver having communication circuitry to identify the gain and phase of the electronic device receiver to determine the proximity of the electronic device receiver to the charging pad;
   controlling the charging and powering of the electronic device by the decoded short RF signals; and
   charging the battery of the electronic device when in the proximity to the pad transmitter to provide an inexhaustible source of operating power for the electronic device.

8. The method for a portable wireless charging pad of claim 7, further including the steps of uploading battery information and of uploading the proximity information of the electronic device to the charging pad.

9. The method for a portable wireless charging pad of claim 7, further including the step of pocket-forming of the pad transmitter to send pockets of energy to the electronic device receiver in the proximity to the pad of approximately 15 feet or less for charging and powering the electronic device.

10. The method for a portable wireless charging pad of claim 7, wherein the charging pad is configured in a generally flat rectangular shape of approximately 2 inches by 4 inches and is capable of being placed into a brief case, bag or purse along with the electronic device to be charged or powered.

11. The method for a portable wireless charging pad of claim 10, wherein the antenna elements of the pad receiver are in a generally flat configuration and located on a surface of the charging pad.

12. The method for a portable wireless charging pad of claim 10, wherein the antenna elements of the pad receiver are configured on a top surface of the pad to receive the pockets of energy within a 15 foot range from the power transmitter.

13. A method for a portable wireless charging pad, comprising:
   searching for a wireless charging request from a portable electronic device within a predetermined range from the charging pad;
   scanning for a standard communication protocol signal representing the charging request from the portable electronic device; and
   pocket-forming from a pad transmitter for supplying pockets of energy to an electronic device receiver requiring the charging,
   wherein the pad transmitter is configured in a shape of a generally flat rectangular box having antenna elements around a circumference of the box for receiving the pockets of energy for the pad receiver.

14. A portable wireless charging pad, comprising:
   a pad receiver embedded within the charging pad connected to antenna elements on a surface of the pad for receiving pockets of energy from a pocket-forming power transmitter to charge a pad battery; and
   a pad pocket-forming transmitter powered by the pad battery including a RF chip connected to antenna elements for generating pockets of energy to charge or power a portable electronic device having a receiver to capture the pockets of energy from the pad transmitter when in the proximity of the charging pad.

15. The portable wireless charging pad of claim 14, wherein the electronic device receiver communicates power requests to the pad transmitter through short RF waves or pilot signals sent between the electronic device receiver and the pad transmitter, respectively.

16. The portable wireless charging pad of claim 14, wherein the electronic device receiver communicates power requests for charging through communication protocols of Bluetooth, Wi-Fi, Zigbee or radio FM signals to the pad transmitter.

17. The portable wireless charging pad of claim 14, wherein the charging pad further include inductive elements for charging the electronic device in close proximity to the inductive elements.

18. The portable wireless charging pad of claim 14, wherein the pockets of energy generated from the pad transmitter have a range of approximately 15 feet to the electronic device.

19. The portable wireless charging pad of claim 14, wherein the charging pad further includes a power cord and circuitry and wherein the pad battery is a lithium ion battery module connected to the pad transmitter and the lithium battery is charge either through the power cord or the pad receiver.

20. A method for a portable wireless charging pad, comprising:
- supplying pockets of energy to a pad receiver including circuitry of an antenna element, a digital signal processor (DSP), a rectifier, a power converter and a communications device connected to a pad battery;
- pocket-forming in a pad transmitter including circuitry of antenna elements, a RF integrated chip controlled by a DSP for pocket-forming to develop pockets of energy for charging and powering a battery in an electronic device in proximity to the pad and a communication device controlled by the DSP;
- pocket-forming in a power transmitter supplying pockets of energy to the pad receiver; and
- communicating a power level of the pad battery from the pad receiver to the power transmitter through short RF signals between the pad receiver and power transmitter communication devices, respectively, over conventional wireless communication protocols,
- wherein the charging pad further includes a power cord connected to circuitry for charging the pad battery.

* * * * *